(12) United States Patent
Ginster

(10) Patent No.: US 8,505,694 B2
(45) Date of Patent: Aug. 13, 2013

(54) LINK UNIT OF BRAKE ASSEMBLY FOR BICYCLES

(76) Inventor: Nicholas R. Ginster, Fox Point, WI (US)

( * ) Notice: Subject to any disclaimer, the term of this patent is extended or adjusted under 35 U.S.C. 154(b) by 413 days.

(21) Appl. No.: 12/724,793

(22) Filed: Mar. 16, 2010

(65) Prior Publication Data

US 2010/0230215 A1 Sep. 16, 2010

(30) Foreign Application Priority Data

Mar. 16, 2009 (TW) .................................. 98108410

(51) Int. Cl.
*B62L 3/00* (2006.01)
(52) U.S. Cl.
USPC .................. 188/24.22; 188/24.12; 188/24.13; 188/24.19
(58) Field of Classification Search
USPC ...................... 188/24.12, 24.13, 24.19, 24.22
See application file for complete search history.

(56) References Cited

U.S. PATENT DOCUMENTS

| | | | | |
|---|---|---|---|---|
| 735,113 A * | 8/1903 | Kelland et al. | ............. | 188/24.18 |
| 3,628,635 A * | 12/1971 | Yoshigai | ........................... | 188/6 |
| 4,036,333 A * | 7/1977 | Mathauser | ................ | 188/264 A |
| 4,391,352 A * | 7/1983 | Brown | ........................ | 188/24.12 |
| 7,000,739 B2 * | 2/2006 | Ciamillo | .................... | 188/24.22 |
| 7,419,034 B1 * | 9/2008 | Wu | ............................. | 188/24.21 |
| 7,422,090 B1 * | 9/2008 | Preuss | ........................ | 188/24.12 |
| 2006/0113151 A1 * | 6/2006 | Tsai | ............................ | 188/24.12 |
| 2009/0038894 A1 * | 2/2009 | Liu et al. | .................... | 188/24.22 |
| 2009/0078512 A1 * | 3/2009 | Edwards et al. | ........... | 188/24.12 |

* cited by examiner

*Primary Examiner* — Bradley King
*Assistant Examiner* — Mahbubur Rashid
(74) *Attorney, Agent, or Firm* — Yancy IP Law, PLLC (57) ABSTRACT

A brake system for bicycles includes two pivotably connected first and second arms and two brake pads are respectively connected to the first and second arms. A cable unit is connected to the second arm and includes a brake cable. A link unit includes a first link which is connected between the second arm and the brake cable. A second link has a first end connected to the first arm and a second end of the second link is pivotably connected to a mediate portion of the first link. The distance between the two ends of the first link is longer than the distance between the second end of the first link to the second end of the second link. The brake cable is lifted with less force, the first link lifts the second link which moves the first arm to pivot to stop the wheel rim.

10 Claims, 10 Drawing Sheets

LINK UNIT OF BRAKE ASSEMBLY FOR BICYCLES

FIELD OF THE INVENTION

The present invention relates to a brake assembly, and more particularly, to a bicycle brake assembly with a link unit which allows the brake assembly to be operated with less force and having higher brake efficiency.

BACKGROUND OF THE INVENTION

There are different designs for the brake assembly for bicycles and generally includes the clamp type and the disk brake type, wherein the clamp type clamps the wheel rim to stop the wheel and the disk brake type includes a disk connected to the hub and the wheel is stopped by stopping the disk.

For the clamp type brake assembly, there are cantilever type, C-type, V-type, and hydraulic type, wherein the cantilever type includes two cantilevers locate don two sides of the wheel rim and a brake cable is cooperated with a straddle cable to form an inverted V-shaped arrangement so that when the straddle cable is pulled upward by the brake cable, the two cantilevers are pivoted so as to move the two respective brake pads to contact the wheel rim. C-type includes a brake cable located on one side of the brake assembly and is connected with one of the two arms. The arms are pivoted to stop the wheel by pulling the brake cable.

The C-type brake assembly is used for those bicycles using narrow tire and one of the C-type brake assemblies is disclosed in U.S. Pat. No. 7,000,739 and includes two arms pivotably connected to a bolt and a cam lever and a quick release latch are cooperated with the brake assembly. Another C-type brake assembly is disclosed in U.S. Pat. No. 7,422,090 and includes a link unit which is located between the first and second arms so as to activate the two arms to stop the wheel.

However, the distance between the pivot point of the link unit and the force applying point of the U.S. Pat. No. 7,422,090 is too short so that it requires a significant force to operate the brake assembly. The force has to overcome the resistance from the link unit and the spring member, so that the brake assembly has lower sensitivity which increases the response time to slower or stop the bicycle.

The present invention intends to provide a brake assembly that includes a link unit whose links have optimal arrangement such that the brake action can be made with less force within short response time.

SUMMARY OF THE INVENTION

The present invention relates to a brake system for bicycles and comprises an arm unit including pivotably connected first and second arms and two brake pads are respectively connected to the first and second arms and located on two sides of a wheel rim. A cable unit is connected to the second arm and includes a brake cable which is operated by the user. A link unit is connected between the first and second arms and located at one of the two sides of the wheel rim. The link unit includes a first link which has a first end pivotably connected to the second arm and a second end of the first link is connected with the brake cable. A second link has a first end thereof connected to the first arm and a second end of the second link is pivotably connected to a mediate portion of the first link.

When the brake cable is lifted to pivot the first link upward, the second link is pivoted upward by the first link and the first arm is pivoted to move toward the wheel rim.

The primary object of the present invention is to provide a brake assembly wherein the first and second arms are activated by the link unit, the distance between the position wherein the brake cable is applied and the pivot position that the link unit I connected to the second arm is increased so as to obtain better braking feature.

Another object of the present invention is to provide a brake assembly wherein specific arrangement of the link unit and the second arm allows the user to operate the brake system with less force.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 4, the brake system for bicycles of the present invention is connected to the front and/or the rear wheel, and comprises an arm unit 10, a cable unit 20, a link unit 30 and a spring member 40. The arm unit 10 includes a first arm 11 and a second arm 12 which is pivotably connected to the first arm 11. The first arm 11 includes a first extension end 111 and a link pivot end 112, the first extension end 111 is located beside one of the two sides of the wheel rim 50 and the link pivot end 112 includes an opening defined between two sidewalls. The second arm 12 includes a second extension end 121 and a pivot end 122, the second extension end 121 is located beside the other one of the two sides of the wheel rim 50 and the pivot end 122 is pivotably connected to a first pivot point 15 of the first arm 11. The first pivot point 15 is located between the first extension end 111 and the link pivot end 112. Two brake pads 13, 14 are respectively connected to the first and second extension ends 111, 121 of the first and second arms 11, 12. The two brake pads 13 14 are located on the two sides of the wheel rim 50;

The cable unit 20 is connected to a connection portion 123 of the second arm 12 and includes a housing 22 fixed to the connection portion 123 and a brake cable 21 movably extends through the housing 22. The connection portion 123 is located between the second extension end 121 and the pivot end 122.

The link unit 30 is connected between the first and second arms 11, 12 and located at one of the two sides of the wheel rim 50. The link unit 30 includes a first link 31 and a second link 32, wherein the first link 31 has a first end pivotably connected to a second pivot point 34 of the second arm 12 and a second end of the first link 31 is connected with the brake cable 21. The second pivot point 34 is located between the second extension end 121 and the pivot end 122 of the second arm 12. The second link 32 has a first end thereof inserted into the opening and connected to the link pivot end 112 of the first arm 11 and a second end of the second link 32 is pivotably connected to a mediate portion of the first link 31. A recess 311 is defined in the mediate portion of the first link 31 and the second end of the second link 32 is inserted into the recess 311 and pivotably positioned by a pin 33.

The spring member 40 is a torsion spring and includes two extension legs which are connected to the first and second arms 11, 12 respectively so as to provide a force to the first and second arms 11, 12 toward each other and keep the gap between the two brake pads 13, 14 and the wheel rim 50.

Figure 5:
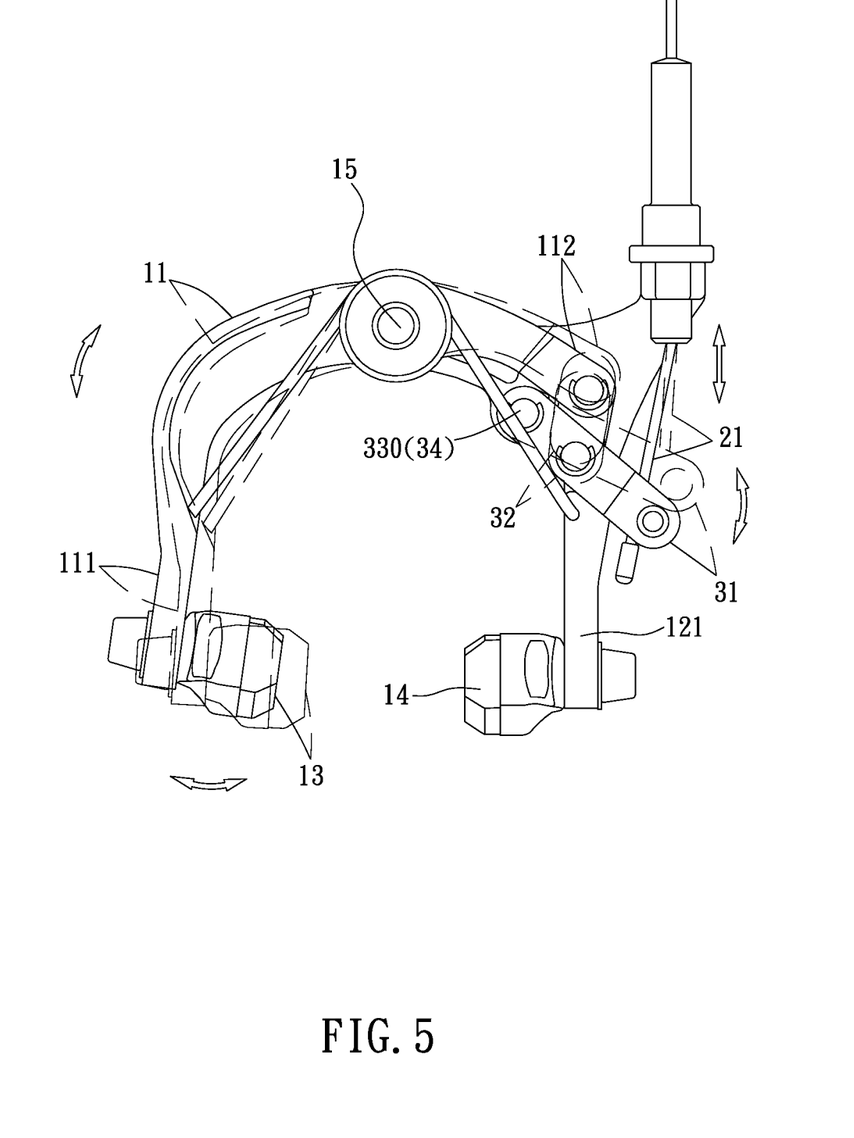
FIG. 5 shows that the link unit is operated to move the first arm.
Figure 6:
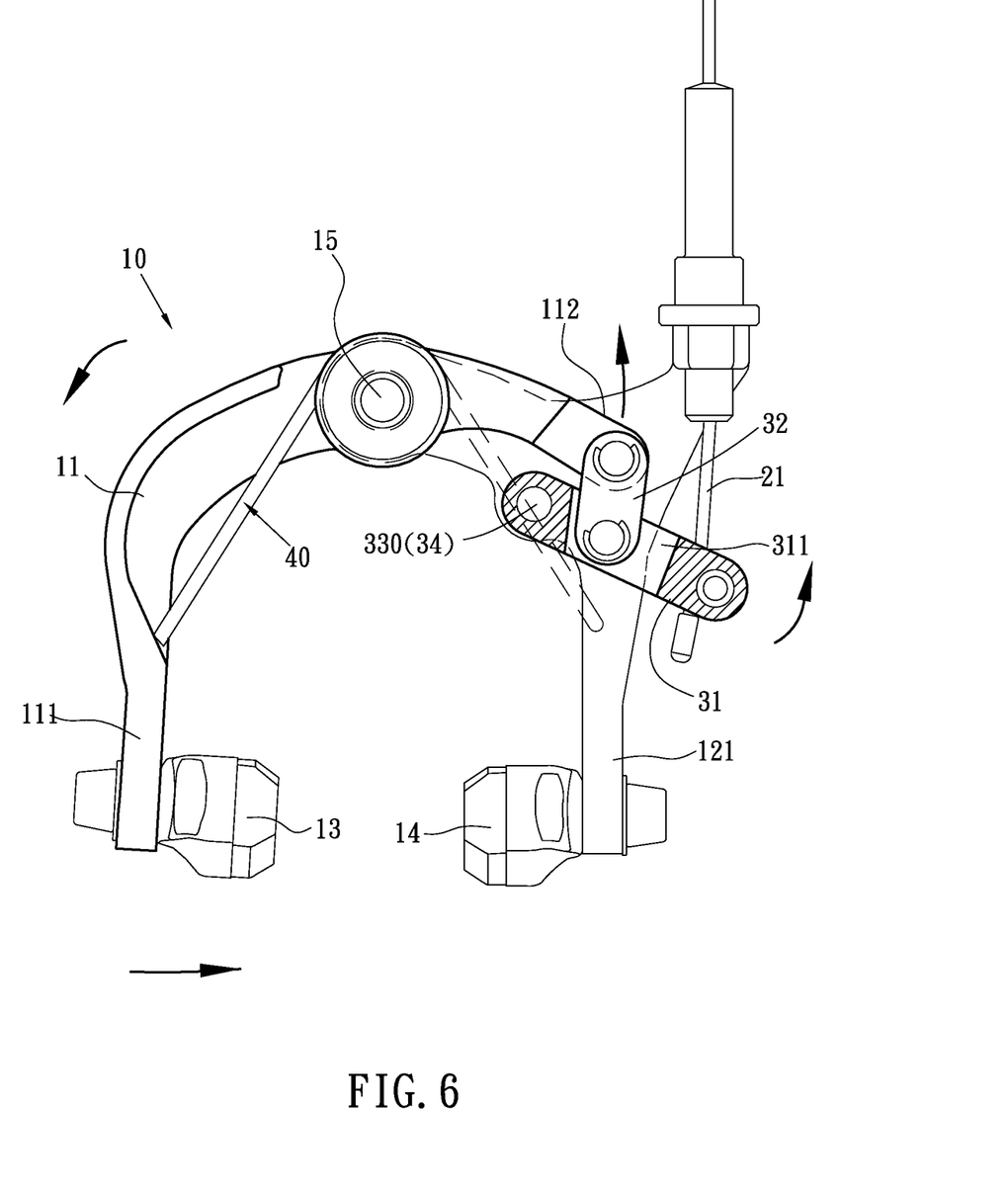
FIG. 6 shows the pivotal movement of the link unit and the movement of the first arm.
Figure 7:
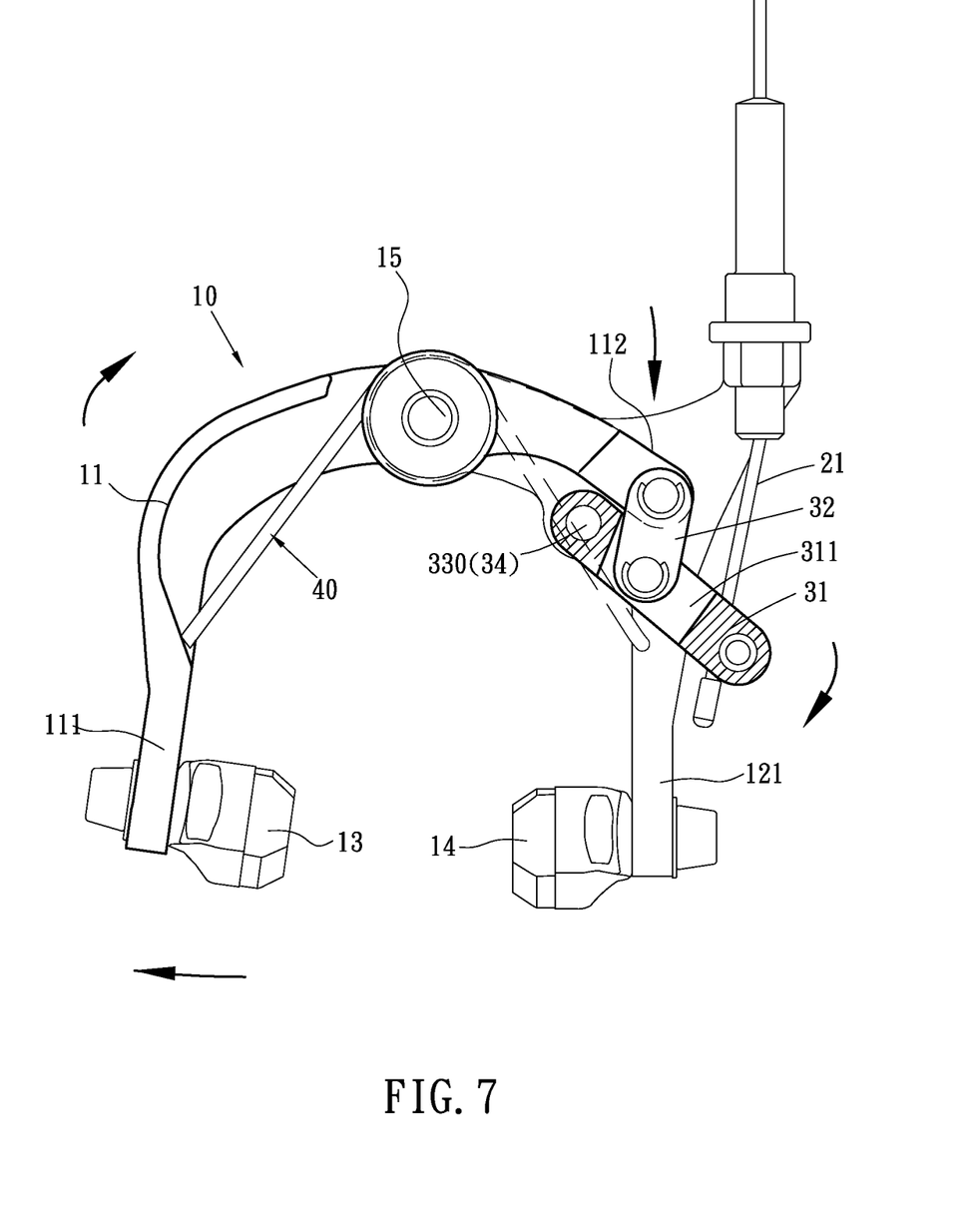
FIG. 7 shows that the first arm and the link unit return to their original positions when the brake cable is released.

As shown in FIGS. 5 to 7, when the rider pulls the brake lever (not shown), the brake cable 21 is lifted and the lift force applied to the brake cable 21 is larger than the spring force of the spring member 40. The first link 31 is pivoted upward about the first pivot point 15, the second link 32 is lifted also due to the movement of the first link 31. The pivotal movement of the second link 32 pivots the first arm 11 which is pivoted about the first pivot point 15 such that the brake pad 13 moves toward the wheel rim 50. When the first link 31 pivots, the first end of the first link 31 drives the second arm 12 to pivot about the first pivot point 15 so that the brake pad 14 moves toward the wheel rim 50. When the two brake pads 13, 14 are in contact with the wheel rim 50, the wheel is slow down or stopped.

As shown in FIG. 7, when the brake cable 21 is released, the spring member 40 pivot the first and second arms 11,12, the link pivot end 112 pushes the second link 32 downward and the first link 31 is pivoted about the second pivot point 34, such that the two brake pads 13, 14 are moved away from the wheel rim 50.

Figure 1:
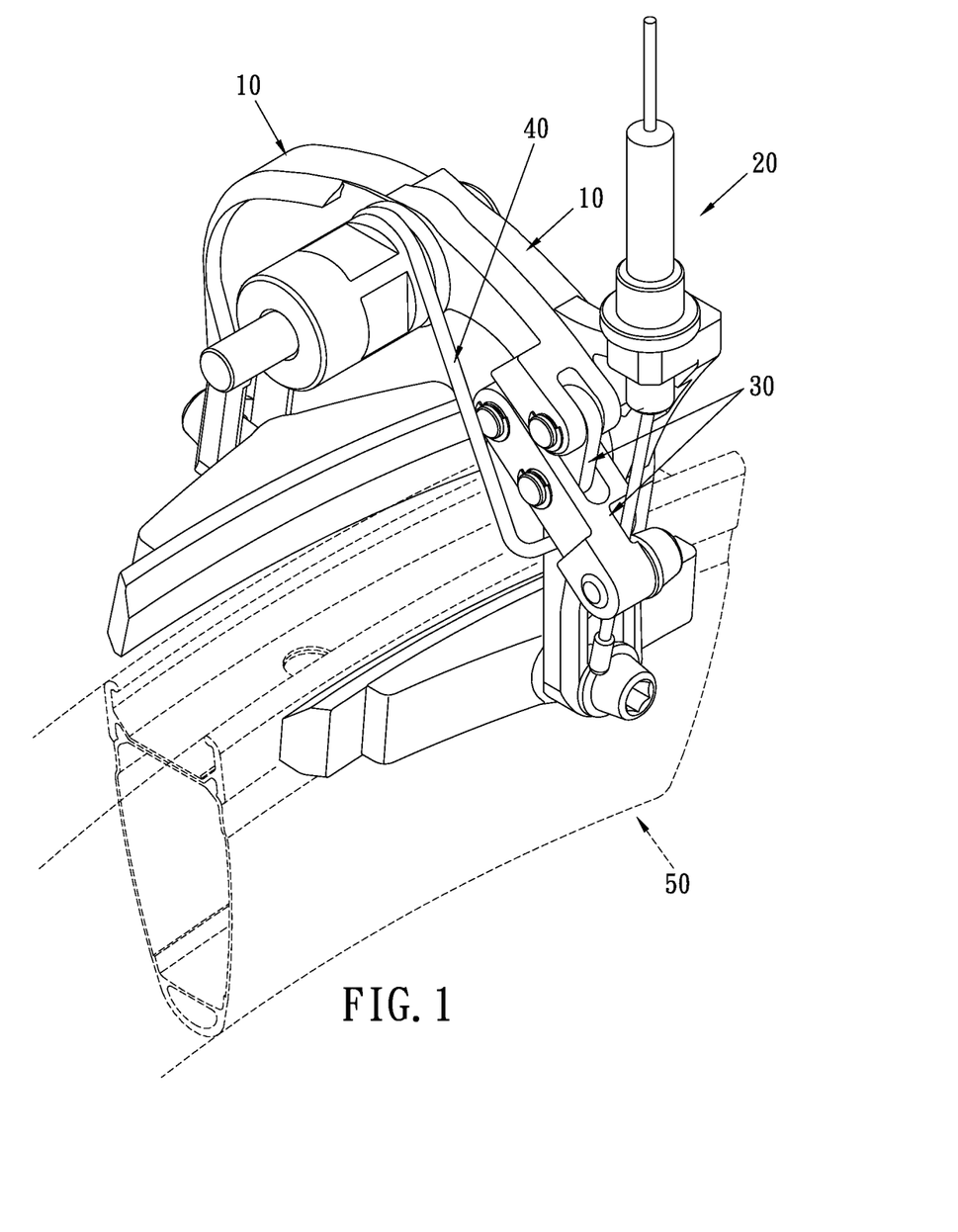
FIG. 1 is a perspective view to show the brake assembly of the present invention and the wheel rim.
Figure 2:
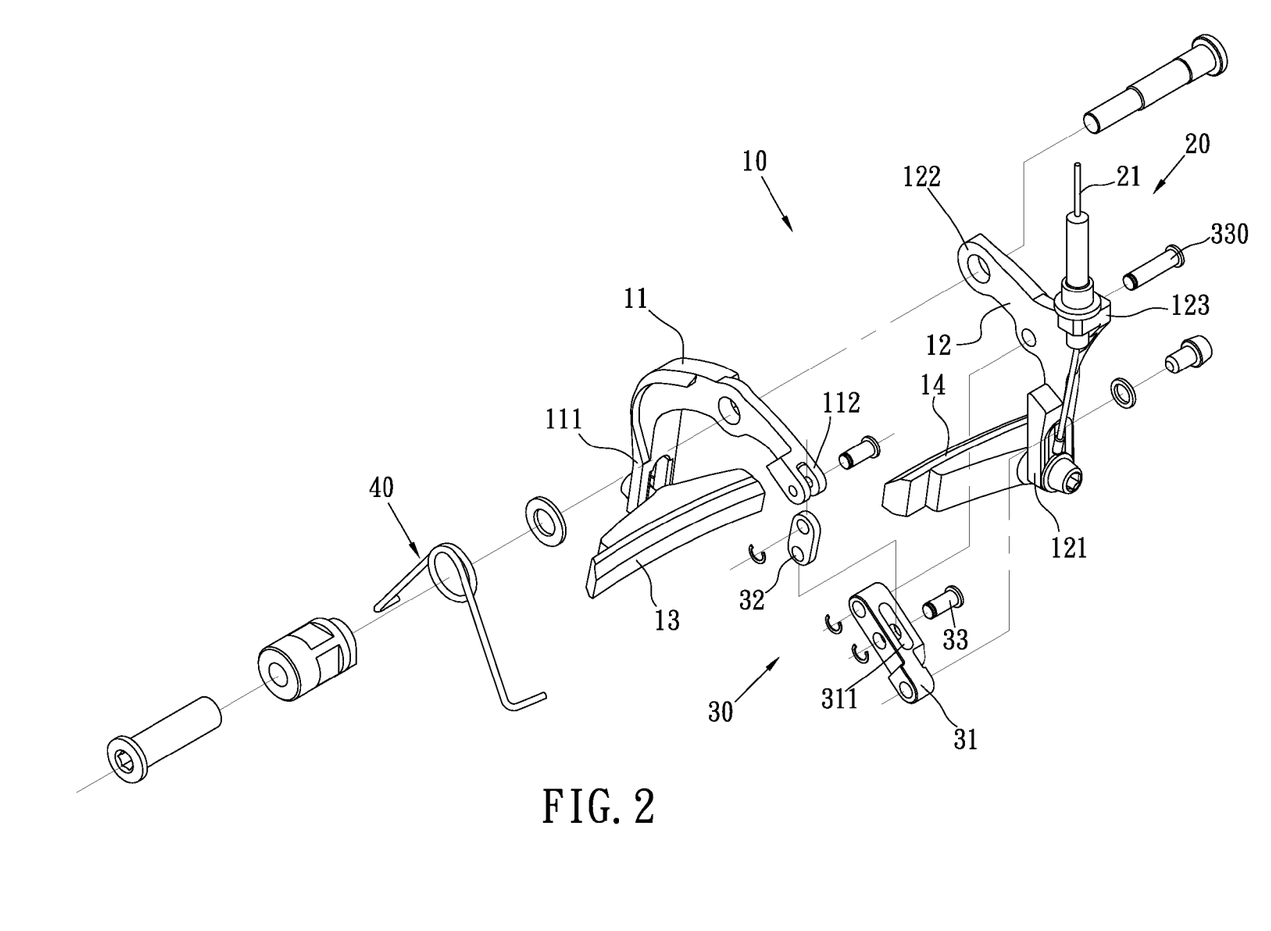
FIG. 2 is an exploded view to show the brake assembly of the present invention.
Figure 3:
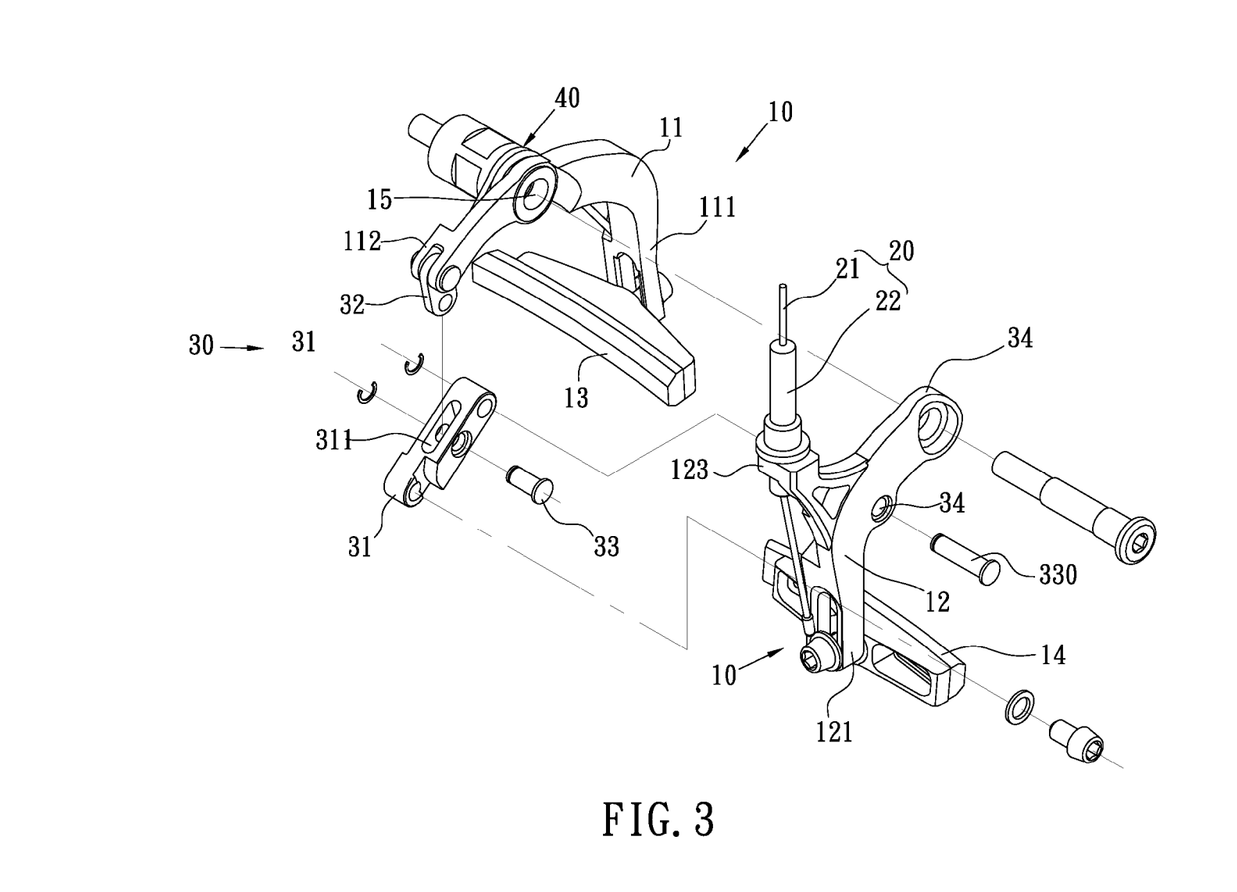
FIG. 3 is an exploded view to show the brake assembly of the present invention from another angle.
Figure 4:
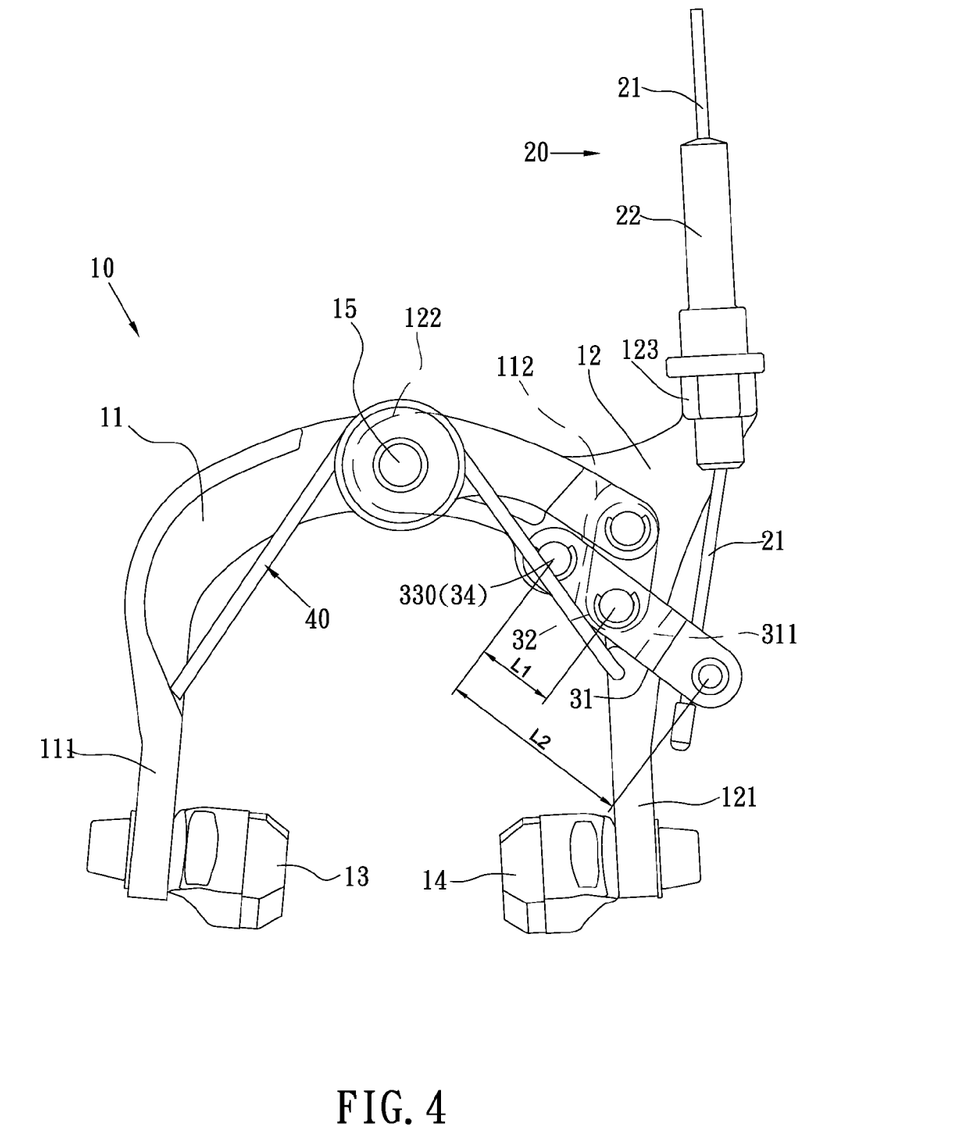
FIG. 4 is a front view of the brake assembly of the present invention.

Referring to FIG. 4, the first link 31 is pivoted about the second pivot point 34 so that the distance "L2" from the second pivot point 34 to the point where the first link 31 is connected to the brake cable 21 is longer than the distance "L1" from the second pivot point 34 to the point where the first and second links 31, 32 are connected and the point where the first link 31 is connected to the brake cable 21 are both located at the same side relative to the second pivot point 34. The specific arrangement makes the brake assembly to be operated with less force and the first arm 11 is pivoted a larger angular distance, this means the brake assembly is operated more sensibly. Besides, the structure of the brake assembly is simple and easily assembled and manufactured.

The recess 311 is located at the center of weight of the first link 31 and the second link 32 is pivotably connected to the recess 311 so that when transmission, the link unit 30 does not shake and reduce lost of energy to minimum.

Figure 8:
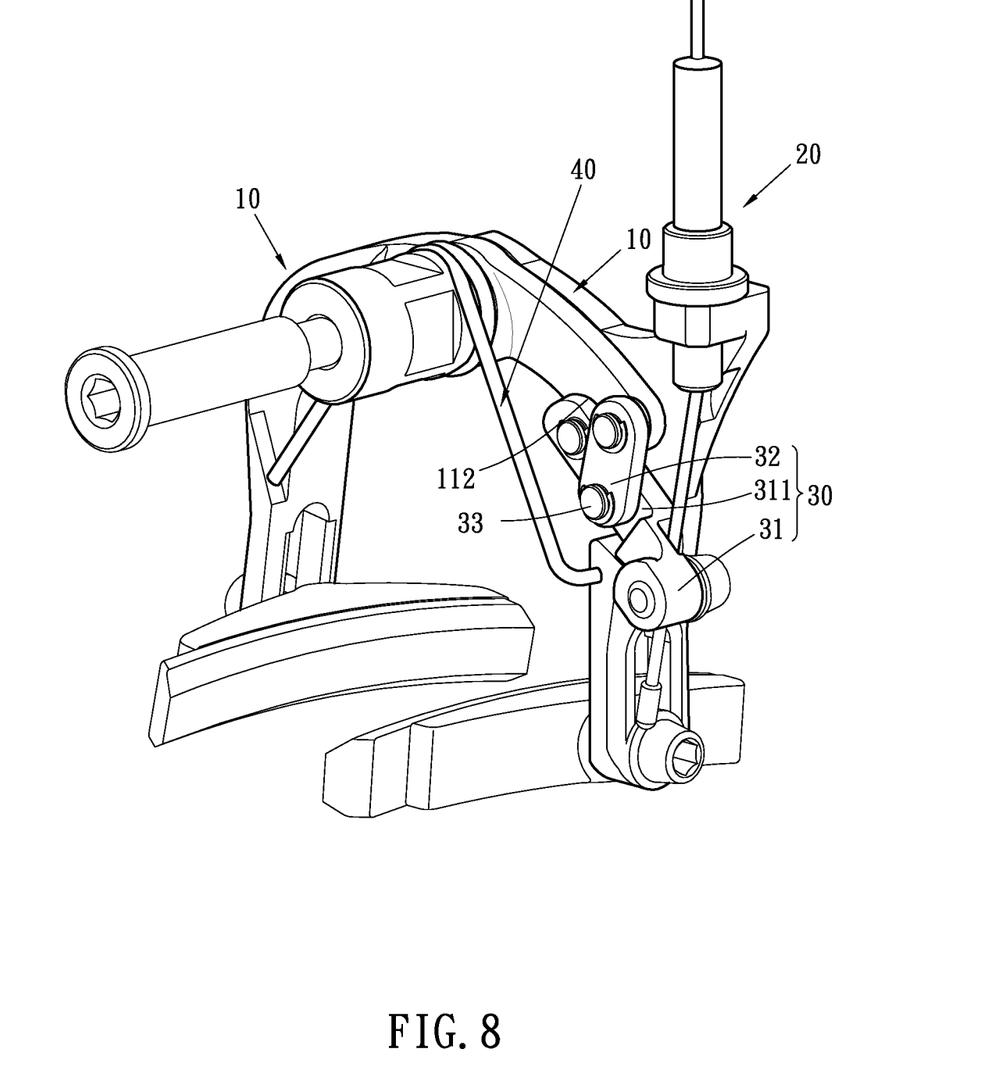
FIG. 8 is a perspective view to show a second embodiment of the brake assembly of the present invention.
Figure 9:
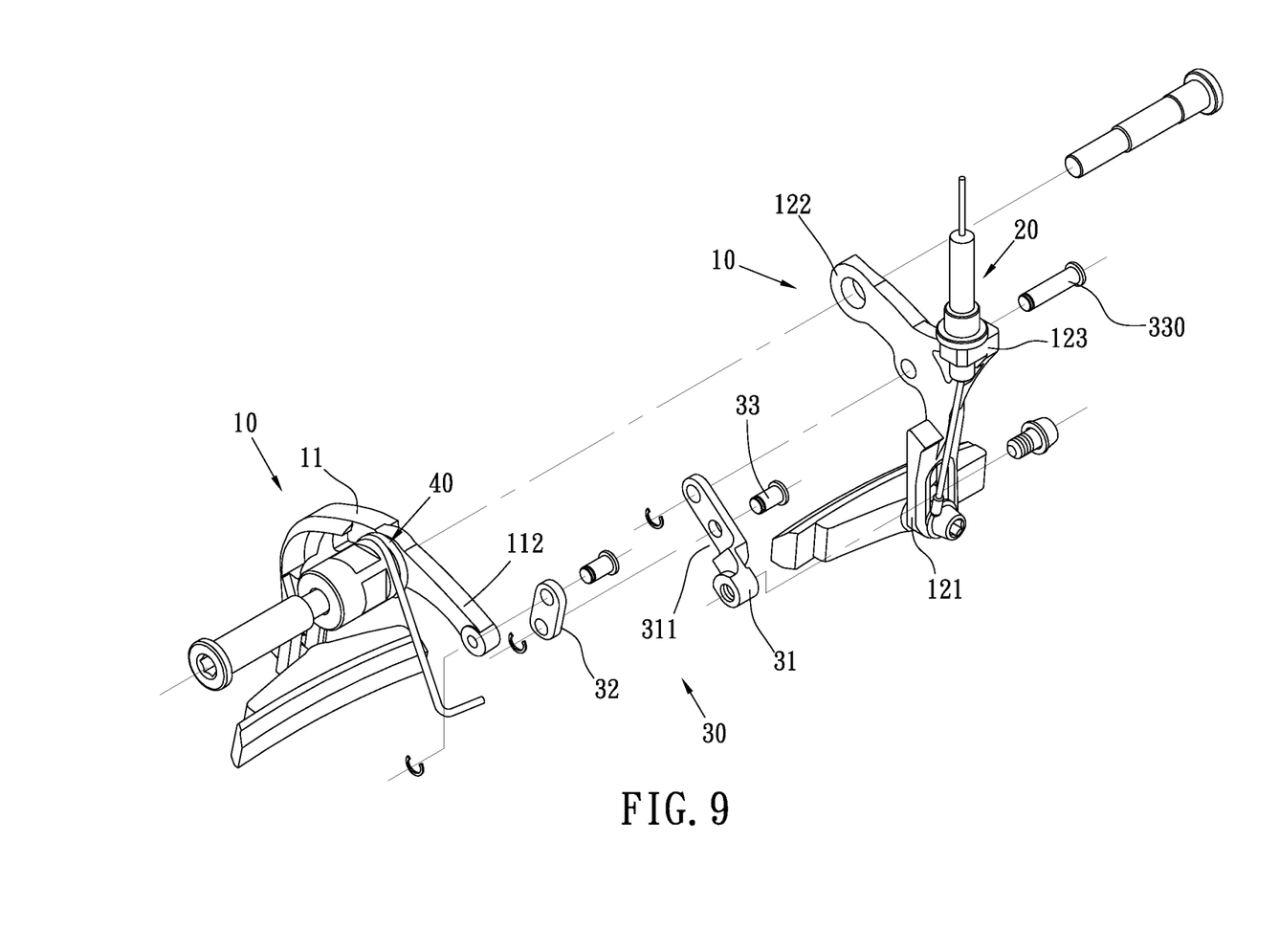
FIG. 9 is an exploded view to show the brake assembly of the present invention in FIG. 8.
Figure 10:
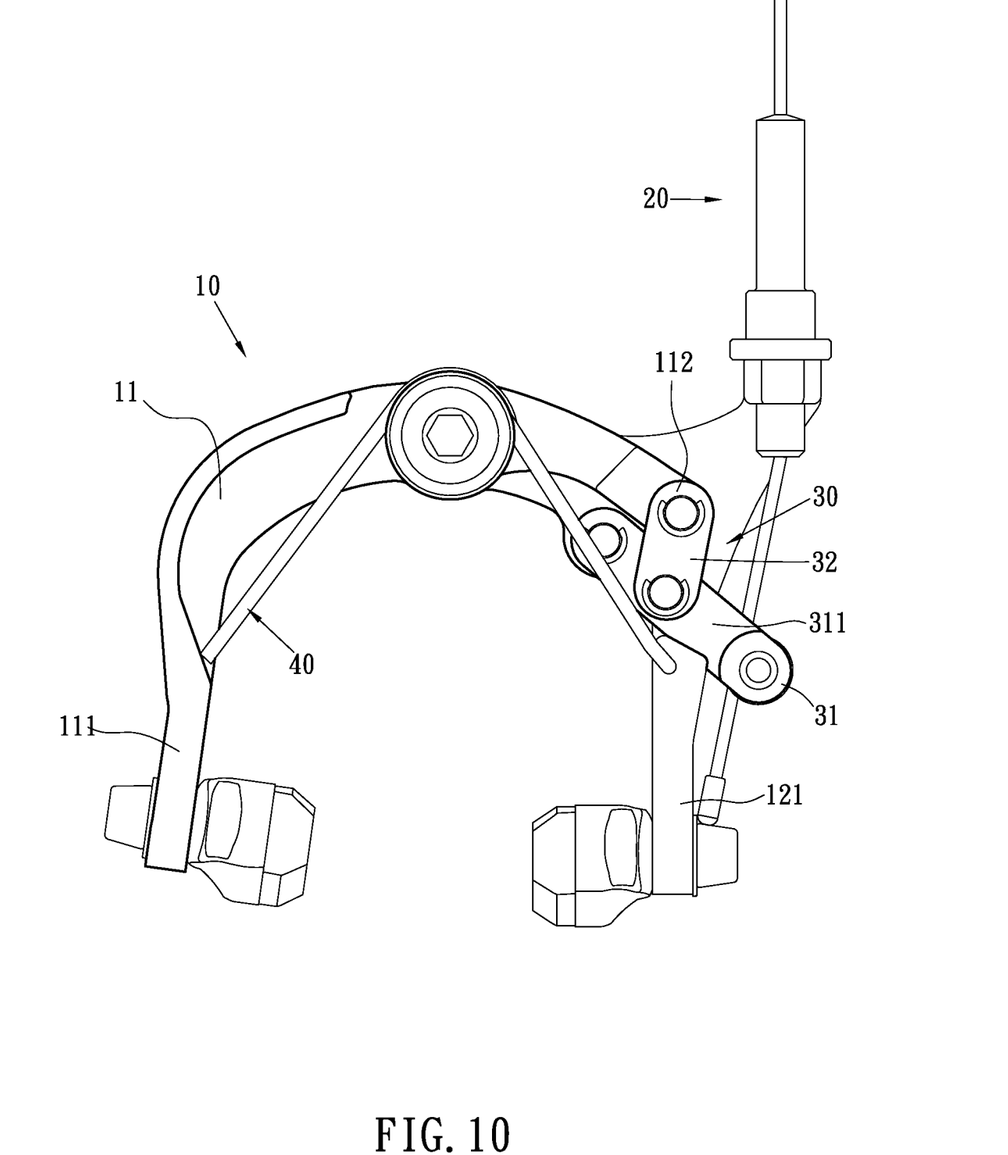
FIG. 10 shows a front view of the brake assembly of the present invention in FIG. 8.

FIGS. 8 to 10 show a second embodiment of the present invention, wherein the first arm 11 has a first extension end 111 and link pivot end 112 on two ends thereof. The first link 31 includes two multiple stepped surfaces and an open recess 311 is defined in the mediate portion thereof. The second end of the second link 32 is pivotably connected with the recess 311.

While we have shown and described the embodiment in accordance with the present invention, it should be clear to those skilled in the art that further embodiments may be made without departing from the scope of the present invention.

What is claimed is:

1. A brake system for bicycles, comprising:
an arm unit including a first arm 11 and a second arm 12, said first arm 11 includes a first pivot point 15 located between a first extension end 111 and a link pivot end 112, said second arm 12 includes a connector portion 123 located between a second extension end 121 and a pivot end 122, the first and second arms pivotably connected to each other at said pivot end 122 of said second arm 12, two brake pads respectively connected to the first and second arms and located on two sides of a wheel rim, wherein said first arm includes a link pivot end;
a cable unit connected to the second arm at connection portion 123 of said second arm 12 and including a brake cable, and
a link unit connected between the first and second arms and located at one of the two sides of the wheel rim, the link unit including a first link which has a first end pivotably connected to the second arm and a second end of the first link connected with the brake cable, a second link having a first end thereof pivotably connected to the link pivot end of said first arm and a second end of the second link pivotably connected to a mediate portion of the first link.

2. The assembly as claimed in claim 1, wherein a connection portion is connected to the second arm and the cable unit is connected to the connection portion.

3. The assembly as claimed in claim 2, wherein the cable unit includes a housing fixed to the connection portion and the brake cable movably extends through the housing.

4. The assembly as claimed in claim 1, wherein a recess is defined in the mediate portion of the first link and the second end of the second link is pivotably inserted into the recess.

5. The assembly as claimed in claim 1, wherein the first extension end 111 is located beside one of the two sides of the wheel rim and the link pivot end 112 includes an opening defined between two sidewalls, the first end of the second link is pivotably inserted into the opening and connected to the link pivot end 112.

6. The assembly as claimed in claim 5, wherein the second arm includes a second extension end and a pivot end, the second extension end is located beside the other one of the two sides of the wheel rim and the pivot end is pivotably connected to a first pivot point of the first arm, the first pivot point is located between the first extension end and the link pivot end.

7. The assembly as claimed in claim 1, wherein a spring member is connected between the first and second arms so as to provide a force to the first and second arms toward each other.

8. The assembly as claimed in claim 7, wherein the spring member is a torsion spring.

9. The assembly as claimed in claim 1, wherein the first arm includes a first extension end and a link pivot end, the first extension end is located beside one of the two sides of the wheel rim and first end of the second link is pivotably connected to the link pivot end.

10. The assembly as claimed in claim 1, wherein the first link includes two multiple stepped surfaces and an open recess is defined in the mediate portion thereof, the second end of the second link is pivotably connected with the recess.

* * * * *